(12) United States Patent
Kato

(10) Patent No.: US 6,220,643 B1
(45) Date of Patent: Apr. 24, 2001

(54) MOUNTING STRUCTURE FOR AUTOMOBILE FOOTREST

(75) Inventor: Hiroyuki Kato, Toyohashi (JP)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/338,871

(22) Filed: Jun. 23, 1999

(30) Foreign Application Priority Data

Jun. 30, 1998 (JP) .................................................. 10-183999

(51) Int. Cl.⁷ .................................. B60N 3/06; A47C 7/50
(52) U.S. Cl. ............................................ 296/75; 297/423.1
(58) Field of Search ............................ 296/75; 297/423.1

(56) References Cited

U.S. PATENT DOCUMENTS

| | | | |
|---|---|---|---|
| 962,637 | * 6/1910 | Hansford | 296/75 |
| 1,981,148 | * 11/1934 | Muench | 296/75 |
| 2,341,080 | * 2/1944 | Burkholder | 296/75 |
| 4,310,193 | * 1/1982 | Kolleas | 296/75 |
| 4,984,838 | * 1/1991 | Kim | 296/75 |
| 5,230,398 | * 7/1993 | Frisbee | 296/75 |
| 5,826,900 | * 10/1998 | Steele | 296/75 |
| 5,836,637 | * 11/1998 | Laginess et al. | 296/75 |

FOREIGN PATENT DOCUMENTS

| | | | |
|---|---|---|---|
| 3337781 | * 10/1984 | (DE) | 296/75 |
| 3730280 | * 12/1988 | (DE) | 296/75 |
| 0271847 | * 6/1988 | (EP) | 296/75 |
| 0319370 | * 6/1989 | (EP) | 296/75 |
| 406092173 | * 4/1994 | (JP) | 296/75 |

* cited by examiner

*Primary Examiner*—D. Glenn Dayoan
*Assistant Examiner*—Hilary Gutman
(74) *Attorney, Agent, or Firm*—Edward D. Murphy

(57) ABSTRACT

A mounting structure for an automobile footrest whereby a footrest can be mounted in a condition with no rattle by a perfectly one-touch operation comprising plate-shaped mounting members mounted with prescribed separation on an automobile body panel and provided with respective engagement parts, and a footrest mounted on these plate-shaped mounting members. The footrest is provided on its rear face with mounting parts capable of engagement in sliding relationship with respective plate-shaped mounting members. These mounting parts are respectively provided with engaging claw structures that resiliently engage engagement parts of the plate-shaped mounting members and are arranged with a separation corresponding to the mounting separation of the plate-shaped mounting members on the vehicle body.

3 Claims, 3 Drawing Sheets

MOUNTING STRUCTURE FOR AUTOMOBILE FOOTREST

BACKGROUND OF THE INVENTION

This invention relates to a mounting structure for an automobile footrest.

Conventionally, nuts and bolts were usually employed for the mounting of automobile footrests. However, with this method of mounting, a large number of steps are required in the mounting operation, and improvement is desired. Consequently, in order to facilitate mounting of footrests, a construction has been proposed, for example in Japanese Utility Model Publication No. H.6-6999, wherein a threaded stud is fixed by welding or the like to an automobile body, and the footrest is mounted by means of a clip provided with an engagement claw that engages the threaded part of this stud. However, with this construction, a mounting clip separate from the footrest must be employed, so a perfect one-touch operation cannot be achieved. Also, with mounting using a stud, rattling in the mounted condition cannot be satisfactorily prevented, so a large peripheral flange of the footrest has to be employed, this flange being pressure-fixed to an automobile panel; this is inconvenient in use.

SUMMARY OF THE INVENTION

The problem that this invention is intended to solve is the provision of a mounting structure for an automobile footrest whereby the footrest can be mounted in a condition without rattle by a perfect one-touch operation.

In order to solve this problem, an automobile footrest mounting structure according to the invention comprises plate-shaped mounting members mounted with prescribed separation on an automobile body panel and provided with respective engagement parts, and a footrest mounted on these plate-shaped mounting members.

The footrest is provided on its rear side with mounting parts capable of engagement in sliding relationship with the respective plate-shaped mounting members. These mounting parts are provided with engagement claw structures that respectively engage with engagement parts of the plate-shaped mounting members, and are arranged with a separation corresponding to the mounting separation of the plate-shaped mounting members on the vehicle body.

In a preferred embodiment of the invention, the mounting parts of the footrest are of hollow shape in which can be inserted the plate-shaped mounting members provided on the automobile body, and their engagement claw structures are integrally formed with a wall part of this hollow shape. Also, in a preferred embodiment, the plate-shaped mounting members are made of metal and are welded to an automobile body panel. Also, the engagement part of the plate-shaped mounting members is in the form of a hole, the footrest is a unitary moulding of plastics material, and the mounting parts of the footrest are formed in hollow shape having concave parts formed with dimensions in the width and thickness direction of a shape whereby the plate-shaped mounting members can be inserted. The engagement claw structures of these mounting parts of the footrest are integrally formed with a wall portion that determines the width direction dimension of the concave part of the mounting part.

The invention further provides a footrest used in the mounting structure for an automobile footrest as described above.

According to the invention, mounting of the footrest can be performed in one-touch manner simply by engaging these mounting parts in sliding relationship with the plate-shaped mounting members on the automobile body. Since the mounting of the footrest is performed by means of a sliding engagement of the plate-shaped mounting members on the vehicle body and mounting parts on the footrest, secure mounting can be achieved without rattling.

DETAILED DESCRIPTION OF THE INVENTION

Figure 1:
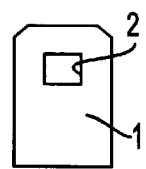
FIG. 1 is a front view showing an embodiment of a plate-shaped mounting member used in a footrest mounting structure according to this invention.

An embodiment of this invention is described below with reference to the drawings. FIG. 1 shows a plate-shaped mounting member 1 employed in the mounting construction of this invention. This mounting member 1 has a rectangular planar shape, being formed by for example a weldable metal material such as steel. A rectangular engagement hole 2 is formed in mounting member 1. This engagement hole 2 constitutes the engagement part of this invention.

Figure 2:
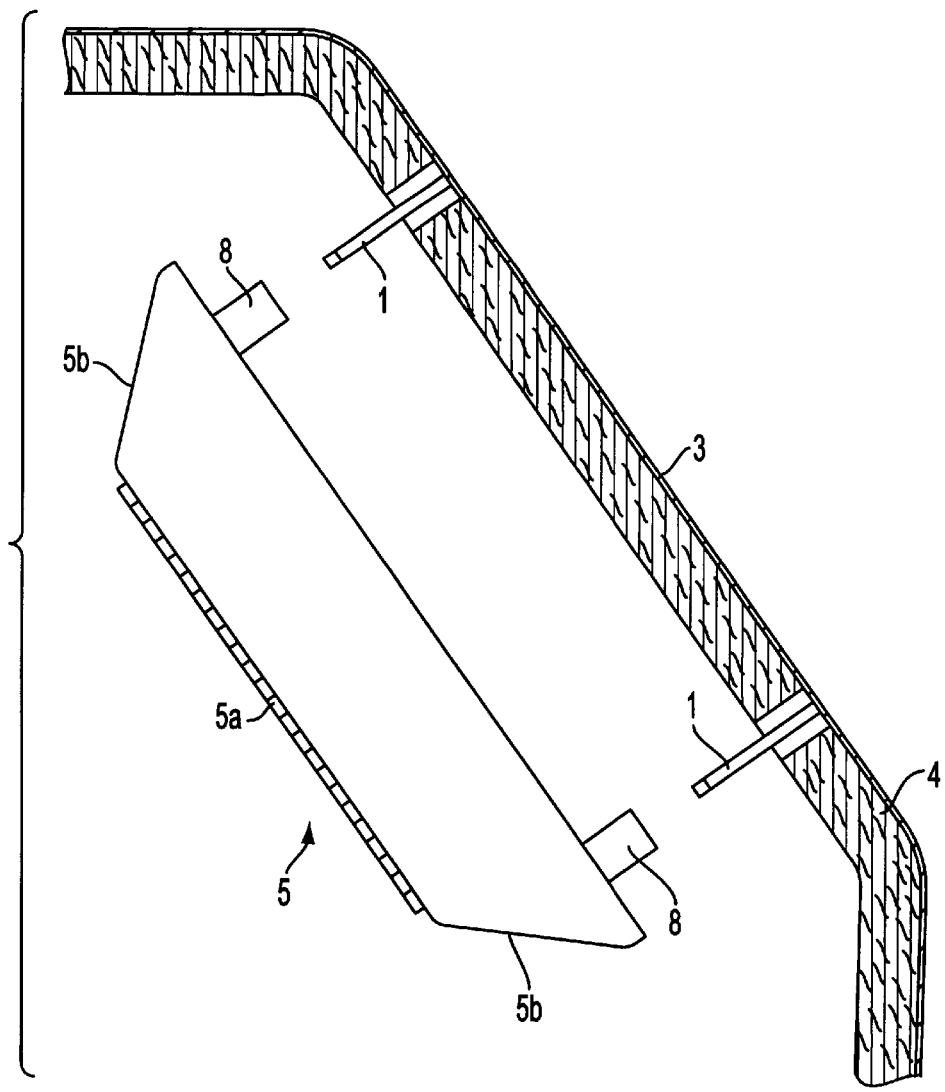
FIG. 2 is a diagrammatic side view showing the mounted condition of a footrest in an embodiment of this invention.

FIG. 2 shows the condition in which this plate-shaped mounting member 1 is mounted on automobile body panel 3, two such plate-shaped mounting members 1 being mounted by welding with prescribed separation on to automobile body panel 3. Reference symbol 4 indicates a floor-covering material such as carpeting.

Figure 3C:
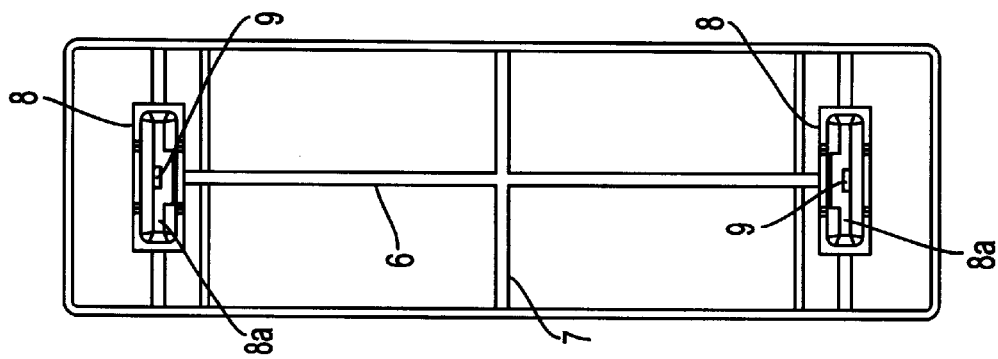
FIG. 3 shows a footrest according to an embodiment of this invention (a) being a plan view, (b) being a side view, and (c) being a bottom view.
Figure 3B:
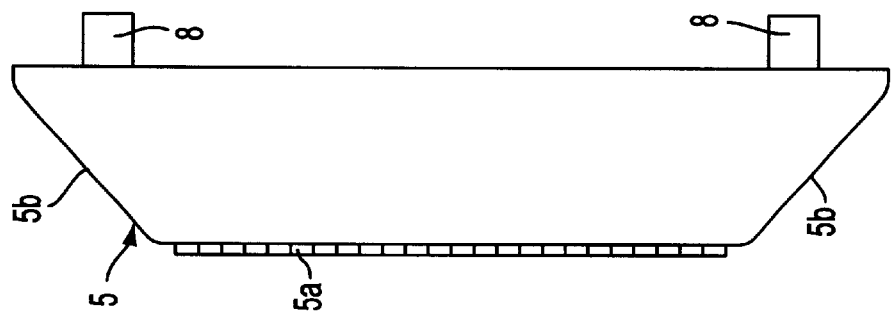
Figure 3A:
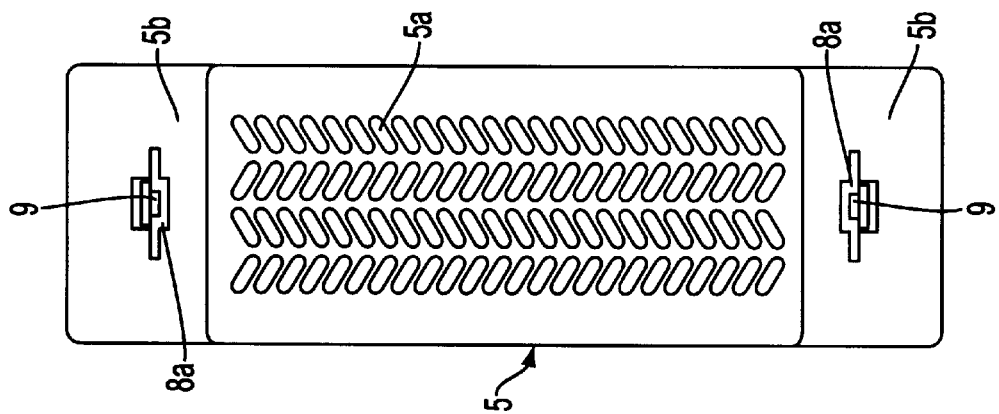

FIG. 3 shows a footrest 5 according to an embodiment of this invention. Footrest 5 is of an elongate rectangular planar shape as shown in FIG. 3(a), and is provided with a footrest part 5(a) of a suitable pattern on its upper surface. As shown in FIG. 3(b), the side face shape of footrest 5 is trapezoidal having inclined faces 5b at both ends thereof, while its underside is of a hollow shape having a cavity. As shown in FIG. 3(c), reinforcing ribs 6, 7 are formed in the interior of footrest 5.

In positions corresponding to the inclined faces 5b at both ends of footrest 5, tubular-shaped mounting parts 8 of rectangular cross-section as shown in FIG. 3(c) are formed. A through-hole 8a of width and thickness corresponding to the width and thickness of plate-shaped mounting member 1 is formed in mounting part 8. The positions of the two mounting parts 8 formed at both ends of the footrest 5 are determined such that the separation of through-holes 8a in the length direction is the same as the mounting separation of plate-shaped mounting members 1 shown in FIG. 2.

Figure 4:
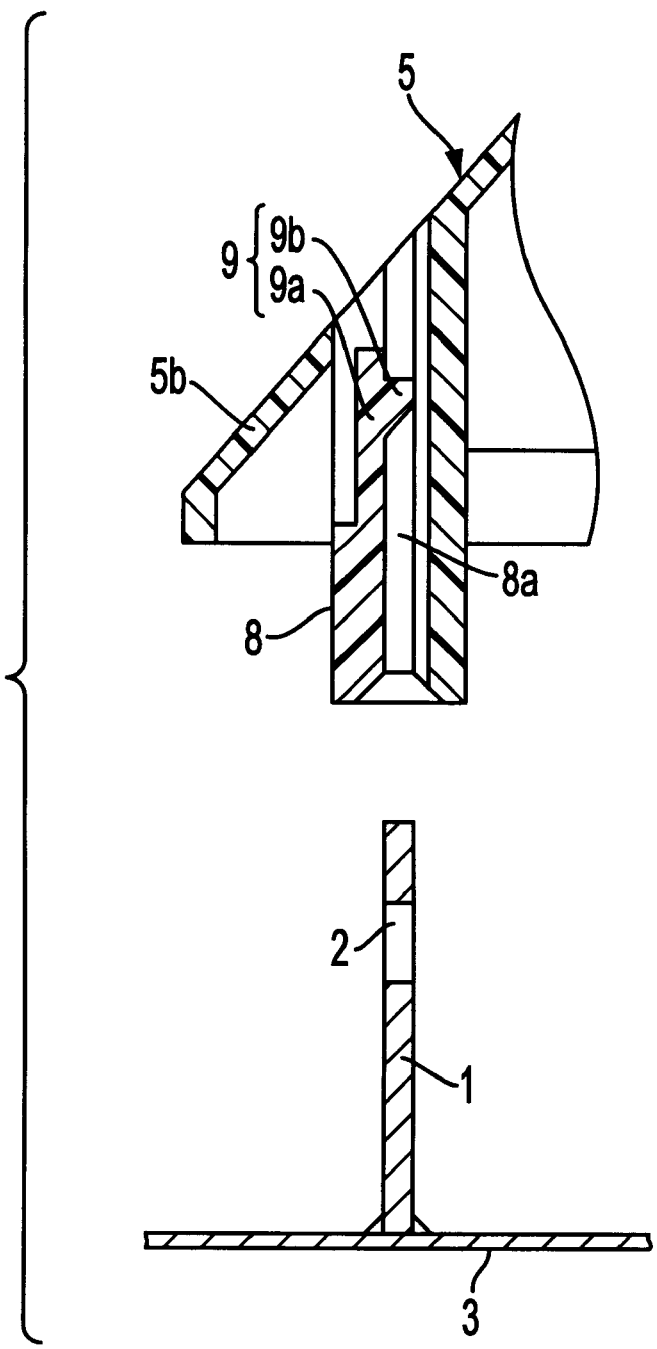
FIG. 4 is a cross-sectional view to a larger scale showing a detail of a mounting part of a footrest in an embodiment of this invention.

As shown in FIG. 4, an engagement claw 9 is formed on the wall portion of each mounting part 8. Engagement claw 9 is integrally formed with mounting part 8 and comprises a practically rectangular thin plate-shaped part 9a and an engagement claw part 9b that projects from this thin plate-shaped part 9a in the direction of through-hole 8a. The entire footrest 5 is manufactured by unitary moulding of plastics material; engagement claw 9 is capable of flexure in the transverse direction with respect to through-hole 8a.

As shown in FIG. 2, when mounting footrest 5, footrest 5 is located in position such that the mounting parts 8 of this footrest 5 correspond to the two plate-shaped mounting members 1 mounted on automobile body panel 3, and the plate-shaped mounting members 1 are fitted into through-holes 8a of mounting parts 8. In this operating state, the engagement claws 9 formed in mounting parts 8 of footrest 5 flex on passage of plate-shaped mounting member 1, making it possible to insert this plate-shaped mounting member 1 into through-holes 8a. When plate-shaped mounting members 1 are fully inserted into through-holes 8a of mounting part 8, the engagement claw parts 9b of engagement claws 9 engage holes 2 of plate-shaped mounting members 1, thereby fixing footrest 5 on to automobile body panel 3.

What is claimed is:

1. A footrest assembly for a body panel of an automobile comprising:
   a. a pair of vertical members spaced from each other and affixed to a floor panel;
   b. each of pair of vertical members having a hole formed therein and spaced below the top thereof;
   c. a footrest;
   d. a pair of mounting projections formed on an underside of the footrest and spaced from each other substantially the same distance as that of the pair of vertical members;
   e. each of pair of mounting projections having an axial opening therein;
   f. a flexible claw formed of each of the pair of mounting projections and extending into the axial opening of each of the pair of mounting projections;
   g. the pair of mounting projections receiving the pair of vertical members in the axial opening thereof to connect the footrest to the body panel; and
   h. the flexible claws of the pair of mounting projections engaged in the holes of the pair of vertical members to clamp the footrest in a mounted position.

2. The foot assembly claimed in claim 1 wherein:
   a. the pair of vertical members is formed of metal; and
   b. the pair of mounting projections is formed of plastic.

3. The foot assembly claimed in claim 2 wherein:
   a. the footrest having opposite ends formed to slope downwardly toward the floor panel; and
   b. each of the pair of mounting projections is formed on the opposite ends of the footrest.

* * * * *